Figure 1:
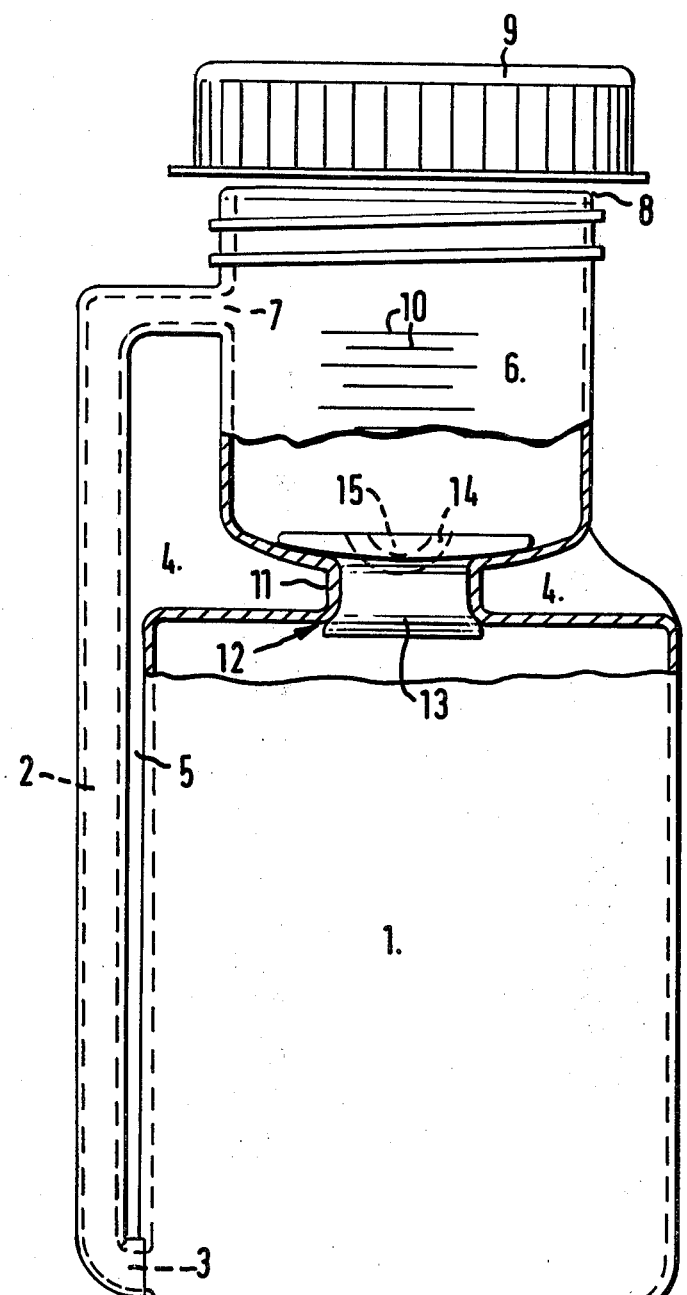

United States Patent [19]

Jackman

[11] 4,418,843

[45] Dec. 6, 1983

[54] SINGLE-MOUTH SQUEEZE-BOTTLE DISPENSING CONTAINER

[75] Inventor: Anthony D. Jackman, Weybridge, England

[73] Assignee: Bettix Limited, New Malden, England

[21] Appl. No.: 351,461

[22] Filed: Feb. 23, 1982

[30] Foreign Application Priority Data

| Mar. 2, 1981 | [GB] | United Kingdom | 8106546 |
| May 8, 1981 | [GB] | United Kingdom | 8114203 |
| May 29, 1981 | [GB] | United Kingdom | 8116550 |

[51] Int. Cl.³ .................. G01F 11/26; G01F 11/08
[52] U.S. Cl. .................................... 222/158; 222/207
[58] Field of Search ............... 222/157, 158, 205, 206, 222/207, 211, 156, 159, 441, 454, 455, 456

[56] References Cited

U.S. PATENT DOCUMENTS

| 3,141,574 | 7/1964 | Donoghue | 222/158 X |
| 3,396,875 | 8/1968 | Finch | 222/456 |
| 4,077,547 | 3/1978 | Donoghue | 222/207 |
| 4,105,142 | 8/1978 | Morris, Jr. | 222/158 |
| 4,106,673 | 8/1978 | Donoghue | 222/207 |
| 4,298,038 | 11/1981 | Jennings | 222/158 X |

FOREIGN PATENT DOCUMENTS

| 15560 | 9/1980 | European Pat. Off. . | |
| 865810 | 12/1952 | Fed. Rep. of Germany | 222/158 |
| 2173838 | 10/1973 | France | |
| 2038779 | 7/1980 | United Kingdom . | |

Primary Examiner—David A. Scherbel
Attorney, Agent, or Firm—William R. Hinds

[57] ABSTRACT

A squeeze-bottle liquid-dispensing container having a single mouth and a liquid-holding bottle connected to an integral measuring and dispensing receptacle by an integral duct has the receptacle, or a pouring head, joined to the bottle by a neck having a throat closed by a plug insertable through the mouth of the receptacle. A removable liner may be provided to fit inside the receptacle or pouring head and may form an integral component with the plug.

10 Claims, 6 Drawing Figures

SINGLE-MOUTH SQUEEZE-BOTTLE DISPENSING CONTAINER

This invention relates to a dispensing container for liquids and provides an improved container for repeated delivery of a measured quantity of liquid.

The invention is applied to a known kind of squeeze-bottle liquid-dispensing container having a liquid-holding bottle connected to an integral measuring and dispensing receptacle by an integral transfer duct, for liquid to be expressed from the bottle into the receptacle or sucked back by squeezing or relaxing squeeze of the bottle to change its volume. Such a container is described in my U.S. patent application Ser. No. 243,254.

For different purposes there are different requirements which such a dispensing container should meet. In particular, it may be required to provide a sealed container which cannot be refilled, a container which can easily be refilled, or a dispensing receptacle of adaptable capacity and variety of uses.

The present invention provides a container which, with modifications all employing one simple feature in common, enables a range of requirements to be met.

The invention is applied to a squeeze-bottle liquid-dispensing container having a single mouth and comprising a liquid-holding bottle, a measuring and dispensing receptacle and a liquid-transfer duct extending from close to the bottom of the bottle to the receptacle, all moulded as an integral whole from resiliently flexible material. According to the present invention, a plug, insertable through the mouth of the container, completely closes the throat of a neck of the bottle.

Such simple provision of the bottle with a closing plug has far-reaching results on the adaptability of the container to a variety of uses.

The adaptability is enhanced by a further feature of the invention comprising the provision of the receptacle with a removable liner fitting closely against the inside surface of the receptacle.

It is important to distinguish the present invention from prior proposals, such as in U.S. Pat. No. 4,106,673 (Donoghue), to provide, in a throat between a reservoir and measuring chamber of a dispensing container, a plug with a bore to receive a liquid-transfer tube. Such a plug is only a support for the tube and is in no sense equivalent to the throat-closing plug in the present invention.

Also it has been proposed, in the same U.S. Pat. No. 4,106,673, to provide a measuring chamber with an inner wall spaced from an outer wall to define between the walls a liquid passage in extension of the liquid-transfer tube. Such an inner wall is not the equivalent of a liner as provided by the present invention.

The scope for adaptability and variety of purpose, imparted to dispensing containers by the provision of a closing plug, with or without a liner, in accordance with the invention, is illustrated by the following survey of possible features.

The plug may be a removable plug, for example of a suitably flexible material and shaped to form either a soft yielding fit or a snap fit in the throat, or a permanent plug sealed in, or not removable without damage, so that the container is not re-usable. Preferably the plug is a permanent closure because the containers of the present invention are of low cost and the danger of re-use for any noxious liquid is not worth a small cost saving.

The removable liner is provided to fit against a part or substantially the whole of the inside of the dispensing receptacle and modify, in one way or another, the function of the container.

The dispensing receptacle liner may be separate from the plug or joined to the plug, separably or inseparably, to serve various purposes.

Particular embodiments of the liner and respective purposes thereof are as follows:

(a) The liner is a removable sleeve or cup which, when in place in the dispensing receptacle, seals the outlet of the transfer duct to prevent unwanted transfer of liquid into the dispensing receptacle prior to removal of the liner. The liner may be replaceable, to reseal the duct outlet, or may be deliberately made non-re-usable so as to show that a container has been opened. If the liner is formed as a cup it may, after removal, serve in use of or for administering dispensed liquid poured from the receptacle.

(b) The liner forms an extension of the plug so as to occupy, to a known volume, the lower part of the dispensing receptacle and thus change the capacity of the receptacle. This enables containers to be made of one size and be adapted, by use of a liner of suitable size, to dispense doses of liquid of a given quantity less than the unlined capacity of the dispensing receptacle.

(c) The liner and plug are initially joined, by being formed integrally or otherwise, the liner assists insertion of the plug into the throat of the container and, optionally, the liner is separable from the plug after insertion so that the container is not re-usable. If made separately, the liner and plug may be joined by adhesive or by a joint, which may be a one-way joint or may not be re-engageable. If made integrally, the liner and plug may be joined by a frangible portion, such as a shearable web or tabs, which breaks when the liner is removed, on first use of the container, leaving the plug in place. The liner and plug could however be permanently joined, the transfer duct opening into the liner which then serves as the dispensing receptacle, so that the container is re-fillable when the plug is removed with the liner.

(d) The mouth of the container and the neck of the bottle are offset to one side of the upper part of the container with an intervening pouring head, connected to or forming part of the receptacle which extends towards the other side of the container, and the outlet from the duct is directed downwardly through the top of the receptacle. In such embodiment, the receptacle and a moulded web portion between the receptacle and the adjacent upper part of the bottle may form a shoulder of the container serving as a handle.

Figure 2:
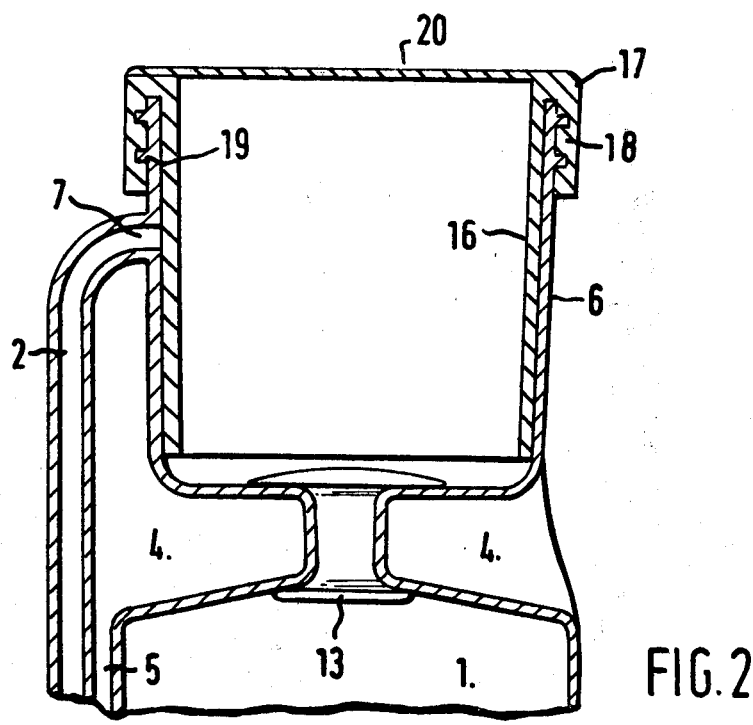
Figure 3:
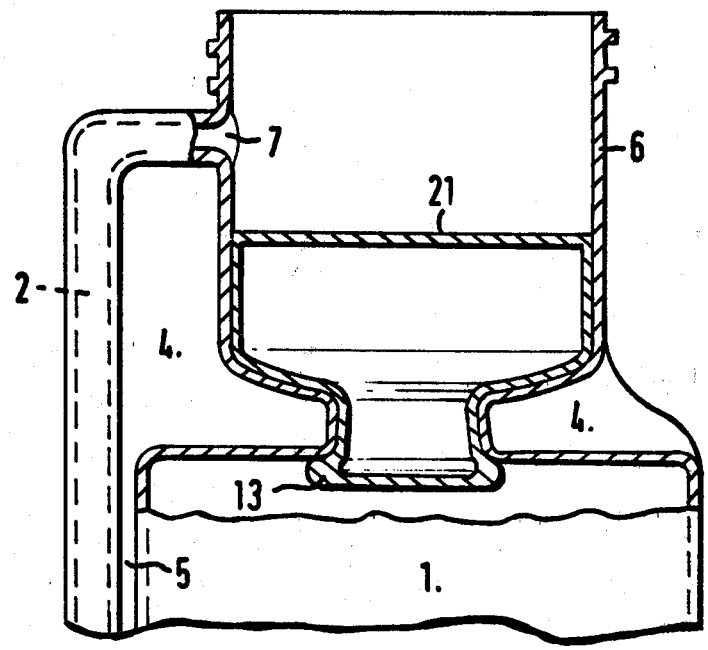
Figure 4:
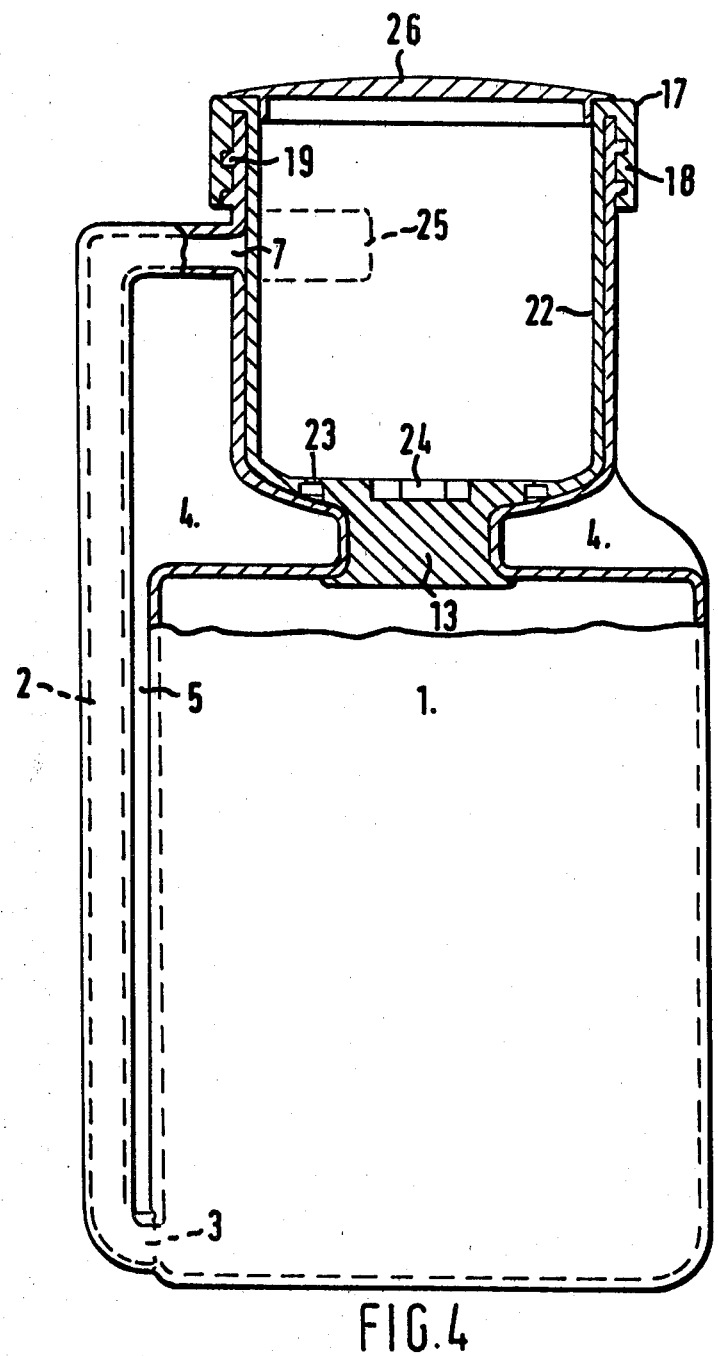
Figure 5:
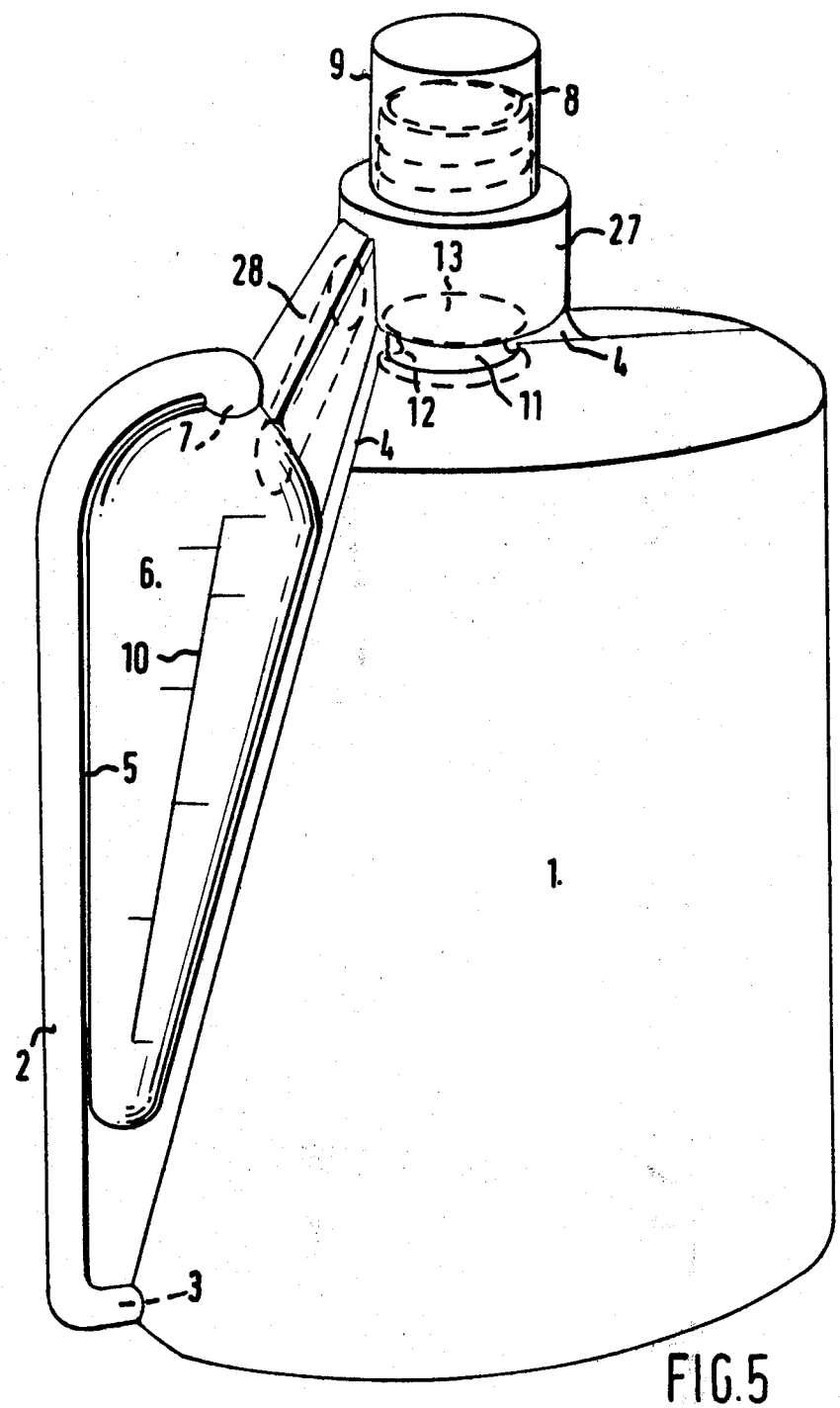
Figure 6:
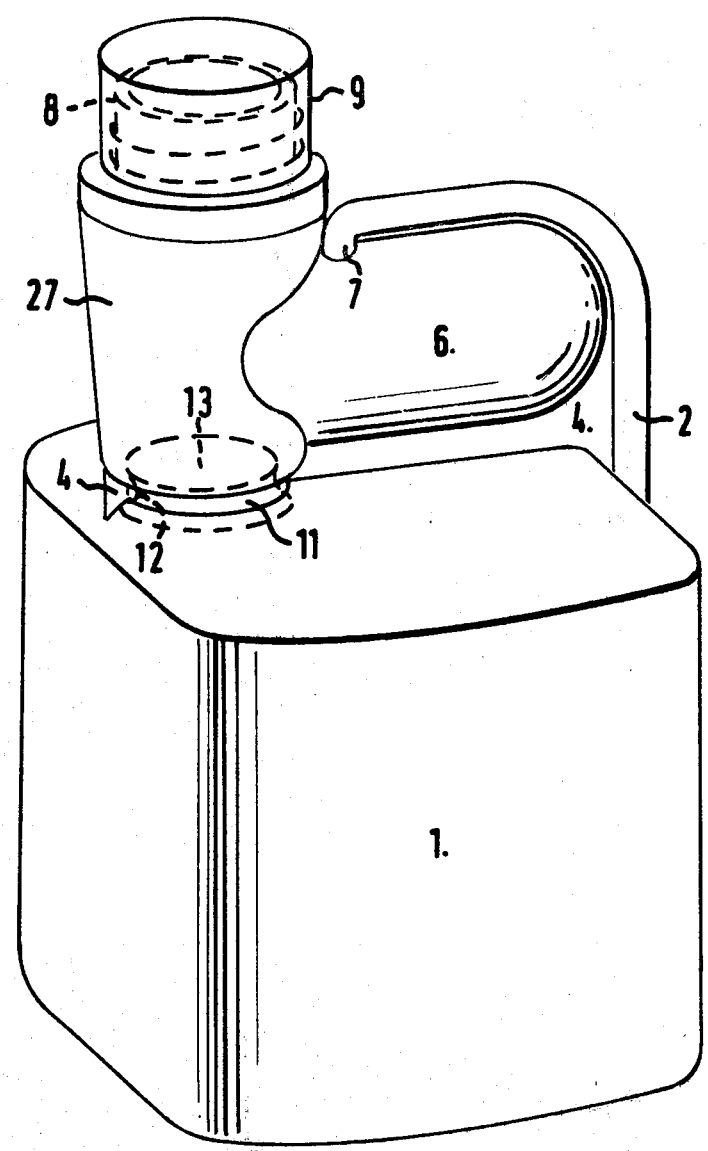

The above and other features of the invention are illustrated, by way of example, on the accompanying drawings, in which:

FIG. 1 is a part-sectional side elevation of a container according to one embodiment of the invention, without the dispensing receptacle having a liner, FIGS. 2 and 3 are each a fragmentary part-sectional elevation of the upper part of a container showing respectively a different embodiment of the invention in which the dispensing receptacle has a liner, FIG. 4 is a part-sectional side elevation of another embodiment of a container with an integral plug and liner component, and FIGS. 5 and 6 are perspective views of further embodiments of a container having a pouring head between the mouth and bottle throat, the receptacle providing a handle.

The container, illustrated as a whole by FIGS. 1, 4, 5 and 6, is made by known blow-moulding technology in which a tubular parison of thermoplastic material is extruded and then blown while pressed between a pair of dies to flatten and interweld opposed wall portions, around the hollow shapes of the container, receptacle and duct, and cut off any material excess to the required overall shape.

As shown by FIG. 1, a bottle 1 is formed integrally with a duct 2 which extends, from a bottom inlet 3, upwards externally alongside the bottle. Opposed wall portions of the container are, during moulding, flattened and interwelded to form web portions 4 and 5 which define the duct 2 and a dispensing receptacle 6, into which the duct 2 opens by an outlet 7, integrally moulded to form the upper part of the container.

The dispensing receptacle 6 is moulded with a full-width screw-threaded mouth 8, for a closure cap 9, and the wall of the receptacle 6 may also, as shown, be moulded with graduation marks 10, to indicate the levels for given volumes of liquid to be dispensed. The material of the whole container is resiliently flexible and preferably transparent or translucent. Suitable materials are polyethylene, which may be internally plasticised by copolymerisation, polypropylene or a butadienestyrene copolymer.

Between the bottle 1 and the dispensing receptacle 6, a neck 11 is moulded, and attention is drawn to the fact that the web portions 4, 4 ensure constant positional relationship of the receptacle 6 with the bottle 1 and duct 2. The provision of such webs 4, particularly in conjunction with the integral duct 2 and its defining web 5, renders stability and strength to the container in spite of it being made from resiliently flexible material.

The neck 11 is moulded with an open throat 12, a tubular blowing mandrel extending through the throat during the blow-moulding process, the mandrel having vents, to supply air to inflate the bottle 1 and receptacle 6, respectively below and above the throat 12.

After the bottle 1 has been filled with liquid to be dispensed there is inserted, through the wide mouth 8 of the receptacle 6, a plug 13 to close the throat 12 to prevent leakage of fluid through the throat when the bottle 1 is squeezed to transfer liquid through the duct 2 into the receptacle 6.

The plug 13 may be made of a yielding material, such as a soft elastomer, so that it may be pressed into the throat 12 and withdrawn therefrom, for which latter purpose it may be formed with a recess 14 spanned by a bar 15 for engagement by a hooked withdrawing tool.

Alternatively, the plug 13 may be non-removable, for example being of a stiffly-flexible material so that it establishes a snap fit, or a tight interference fit, in the throat 12 and cannot be withdrawn without damage. For such purpose the plug 13 and/or the wall of the throat 12 may be ridged or recessed for positive interengagement.

The plug 13 may be sealed by the use of an adhesive or other applied sealing material.

In the embodiment of the invention illustrated by FIG. 2, the dispensing receptacle 6 has a liner 16 the wall of which has a slight downward taper to fit tightly against the inside of the receptacle 6 and seal off the duct outlet 7. The rim of the liner 16 has a surrounding skirt 17 with an internal screwthread 18 to engage the external screwthread 19 around the rim of the receptacle 6 and pull the liner 16 tightly to seal in the receptacle 6 as the liner is screwed down.

As shown, the wall of the liner 16 forms only a sleeve in the receptacle 6 but the liner has a closed top 20 so that, after removal, the liner may be inverted and used as a cup.

Alternatively the bottom of the liner 16 could be closed, so that the liner forms a cup in its upright position, and the top of the liner may have a closure, such as a re-usable snap-fit cap or a disposable foil.

FIG. 3 shows an embodiment of the invention in which a plug 13 has moulded therewith an extension 21 forming a liner which occupies the lower part of the receptacle 6 and correspondingly reduces its capacity for dispensed liquid.

The liner 21 is tapered, or may have a peripheral lip or bead around its rim, to seal in the receptacle 6.

For one standard production size of container, a range of liners 21 may be made to provide a choice of effective capacity, and consequent dose, of the dispensing receptacle 6.

The integral plug 13 and liner 21 component is preferably a hollow moulding of resilient deformable plastics material.

Another embodiment with a plug and liner component is shown by FIG. 4, the plug 13 being moulded integrally with a liner 22 to which it is connected by a frangible web 23.

The liner 22 has a rim with a screwthreaded skirt 17, and may also correspond in other respects with the line 16 of FIG. 2, and the upper surface of the plug 13 has a recess 24 to receive a driving tool, such as a hexagonal key, for insertion of the plug and liner when the container has been filled.

By turning of the plug and liner component as it is inserted into the receptacle 6, the screwthreads 18 and 19 serve to pull down the component of the plug 13 to enter the throat 12. The web 23 can be designed to withstand the torque involved as the plug 13 is driven into the throat but to shear, and leave the plug 13 in place, when the liner 22 is screwed from the receptacle 6. Alternatively or in addition, the rim or the mouth of the liner 22 could be shaped, for example could be of hexagonal or other polygonal shape in plan, to receive a key or other tool for use in insertion or removal of the liner. The web 23 may be a continuous ring of thinner material or comprise spaced tabs of suitable angular extent to give, for an appropriate thickness, a required shear strength.

For a re-usable container, the frangible web 23 is omitted so that the plug and liner component can be inserted and removed intact. In such case the liner 22 has a port 25 for admission of liquid from the duct outlet 7.

Instead of being integrally moulded, a plug and liner could be made separately and joined, as by adhesive or a joint, such as an interference fit or a short, steep-pitched, screwthread, which will serve for driving in the plug 13 but not for withdrawal.

As shown, the top of the liner 22 has a removable snap-fit closure cap 26, but this is optional.

In the embodiment shown by FIG. 5, the receptacle 6 is offset to one side of the upper part of the container and has the form of an assymetrically conical cup inclined towards a pouring head 27, between the mouth 8 of the container and the neck 11 of the bottle which are offset towards the other side of the upper part of the container. A branch 28 from the top of the receptacle 6 opens into the pouring head 27. Such a conical receptacle facilitates accurate dispensing of less than full doses, the graduation marks 10 having a more open scale towards the bottom.

As can be seen from FIG. 5, the receptacle 6, branch 28 and web portion 4 form a substantially triangular shoulder which serves as a handle for the container, the receptacle 6 providing a relatively thick grip portion.

The upper end of the duct 2 extends to the top of the receptacle 6 so that its outlet 7 is directed downwardly through the top of the receptacle. This facilitates accurate dispensing of a full dose, any tilted attitude of the container not affecting the level of liquid determined by the duct outlet 7.

An alternative embodiment of the container with an offset pouring head 27 is shown by FIG. 6, the receptacle 6 in this case including the capacity of the pouring head and extending therefrom towards the other side of the upper part of the container.

In FIG. 6 also, the receptacle 6 provides the grip portion of a handle on the shoulder of the container and the outlet 7 from the duct 2 is directed downwardly through the top of the receptacle.

It will be apparent that all the embodiments illustrated enable a container to be made as a single blow-moulding, filled with liquid and then closed, by insertion of a plug, to close the throat, with or without a liner in the dispensing receptacle.

Features described and illustrated with reference to one embodiment may be applied to other embodiments. In particular, a liner may be provided in the pouring head 27 of the embodiments of FIGS. 5 and 6, the pouring head providing access for insertion of the plug 13 in the throat 12 and being capable of receiving a liner in the same way as the embodiments of FIGS. 1 to 4.

I claim:

1. A squeeze-bottle liquid-dispensing container having a single mouth and comprising a liquid-holding bottle having a neck defining a throat in alignment with said mouth, a measuring and dispensing receptacle in fluid connection with said mouth, a liquid-transfer duct extending from close to the bottom of the bottle to the receptacle, all moulded as an integral whole from resiliently flexible material, and a plug, insertable through the mouth of the container, completely closing the throat of said neck of the bottle, whereby liquid can be transferred from the bottle through the duct to the receptacle by squeezing the bottle to reduce its volume.

2. A container according to claim 1, in which the plug permanently closes the throat.

3. A container according to claim 1 or 2, in which a removable liner is provided between said mouth and said throat.

4. A container according to claim 1, in which a removable liner is provided between said mouth and said throat and in which the liner is joined to the plug.

5. A container according to claim 4, in which the liner occupies a lower part of the receptacle and thus determines the capacity of the receptacle.

6. A container according to claim 4, in which the liner is separably joined to the plug so that the liner can be removed from the container leaving the plug in place closing the throat.

7. A container according to claim 1, in which said mouth and said neck are offset to one side of the upper part of the container with an intervening pouring head, connected to or forming part of the receptacle which extends towards the other side of the upper part of the container, and the outlet from the duct is directed downwardly through the top of the receptacle.

8. A container according to claim 7, in which the receptacle and a moulded web portion between the receptacle and the adjacent upper part of the bottle form a shoulder of the container serving as a handle.

9. A container according to claim 8, in which the receptacle is a conical cup offset to one side of the upper part of the container and is joined to the pouring head by a branch.

10. A container according to claim 9, in which the conical cup receptacle is assymetric about its axis of conicity, which is inclined towards the pouring head, and the receptacle forms with its branch a substantially triangular shoulder of the container serving as a handle.

* * * * *